ID
3,477,853
PRODUCTION OF A SWEET CREAM BUTTERMILK FROM LIPOLYZED CREAM

Maurice E. Hull, La Grange, Ill., and Ralph Willard Kline, Glen Ellyn, Ill., assignors to Armour and Company, Chicago, Ill., a corporation of Delaware
No Drawing. Filed Nov. 7, 1966, Ser. No. 592,297
Int. Cl. A23c *17/00*
U.S. Cl. 99—63       5 Claims

ABSTRACT OF THE DISCLOSURE

Sweet cream buttermilk is prepared by the addition of cream, which has been lipolyzed by incubation with a pregastric enzyme, to non-fat milk solids and water, and mixing to form an emulsion. The resulting buttermilk emulsion may be dried to a powder.

---

This invention relates to a new method for producing a sweet cream buttermilk and more particularly, to a method for producing a sweet cream buttermilk from a lipolyzed cream and to the product produced by this method.

Buttermilk was first made as a by-product of the butter-making process. When milk or cream is churned, the dispersed particles of butter-fat coalesce to form a semi-solid butter phase and a relatively fat-free liquid phase referred to as buttermilk, or more specifically, genuine buttermilk.

If sweet cream or unfermented milk is used in the churning process the resultant buttermilk is also referred to as a sweet cream buttermilk. If sour cream or milk is used instead, the resultant product is known as a genuine sour cream buttermilk. Sour cream buttermilk is also produced by the action of certain lactic acid organisms on skim milk to make what is known as cultured buttermilk. Sour cream buttermilk has a higher content of lactic acid than the sweet cream buttermilk and it is this difference that distinguishes one from the other. The content of lactic acid in sweet cream buttermilk is about 0.1 to 0.2% by weight whereas in sour cream buttermilk it is in the range of about 0.6 to 0.9% by weight.

The most common form of sour cream buttermilk is as a beverage characterized by its sharp, tangy flavor. Sweet cream buttermilk has found particular use when converted to a dry, powdered form by one of the common commercial drying techniques such as spray drying or drum drying. The most common use of dry sweet cream buttermilk is in bakery products and dry food mixes. It has also found use as an ingredient of ice cream and as an animal feed.

Manufacturers using dry sweet cream buttermilk have experienced a shortage of this product over the past few years because of the increased use of oleomargarine and other butter substitutes which has decreased the consumption and production of butter and correspondingly reduced the supply of sweet cream buttermilk. In an effort to increase the supply of sweet cream buttermilk, attempts have been made to produce sweet cream buttermilk from skim milk by increasing the fat content to that of natural sweet cream buttermilk. The gross composition of such buttermilk is substantially the same as natural buttermilk but it does not have the same flavor as natural sweet cream buttermilk and it has not met with any significant commercial acceptability. No one to our knowledge has ever been able to produce a sweet cream buttermilk by any method other than by the churning process.

One object of the present invention is therefore to produce a new sweet cream buttermilk by a new method which is independent of the manufacture of butter.

Another object of the present invention is to produce a sweet cream buttermilk that has substantially the same chemical composition, flavor characteristics, and commercial acceptability as a natural sweet cream buttermilk.

A further object of the present invention is to produce a new sweet cream buttermilk that can be dried to a powder and used for the same purposes with equal acceptability as a dried powder made from a natural sweet cream buttermilk.

Other objects and advantages of the invention will become apparent as the specification proceeds.

We have discovered that by adding a lipolyzed cream to non-fat milk solids and water and emulsifying the mixture, a new sweet cream buttermilk can be produced that has substantially the same chemical composition, flavor characteristics, and commercial acceptability as natural sweet cream buttermilk.

The lipolyzed cream is prepared by the method described in the following copending applications: S.N. 456,479, filed May 17, 1965; S.N. 463,370, filed June 11, 1965; and S.N. 480,783, filed Aug. 18, 1965.

The method described in the aforesaid copending applications generally comprises incubating cream containing butter fat with an enzyme that will produce a desired balance of short-chain free fatty acids having chain lengths in the range of $C_4$ to $C_{10}$ but consisting predominantly of butyric acid. These acids are believed to be responsible for producing a buttermilk identical in flavor to the natural product.

The enzyme preferred for this purpose is a lipase prepared by grinding and drying the edible head and neck tissues between the base of the tongue and the trachea of milk-fed animals, as described in U.S. Patent 2,531,239. Such lipase is known as a pregastric esterase. I prefer to use a lipase prepared from the gullet of a calf and sold under the name "Italase C."

Other lipases may be used provided that they do not produce off-flavors or that they are treated to remove inherent off-flavors.

A pregastric esterase is specific for the liberation of the short-chain fatty acids in higher degree than other enzyme preparations. For example, butyric acid is 36.7 percent of the total fatty acids released compared to 8.4 percent for pancreatic lipase (3 hours' reaction time). The specificity for liberation of butyric acid from milk fat triglycerides makes the pregastric esterase particularly advantageous. By way of example, we find that Italase C attacks the linkages attached to butyric, capric, caprylic and caproic acids preferentially, while pancreatic lipase (steapsin) attacks the 1,2 positions of glycerol and liberates whatever fatty acids are attached at these points. In the case of the pregastric esterase, the flavor of the combined water and fat phases in the cultured cream at 0.70% titratable acidity, has a slight bitterness, with buttery flavor well developed, and a strong volatile odor in which the butyric acid odor is most evident. In the case of the steapsin pancreatic lipase, culturing to a much higher acidity is required to obtain a butyric acid odor, and at the higher acidity undesirable long-chain fatty acids are liberated.

The action of the two enzyme preparations is different. The pregastric esterase causes very little separation of the milk protein components, while the pancreatic lipase causes a curdiness to develop and then a separation in the several phases.

In the preferred method of producing the lipolyzed cream, the pregastric esterase is mixed with water and the mixture is then added to the cream which is comprised of butter fat and non-fat solids, holding the cream for a 20 to 30-hour period for the production of the desired level of free fatty acids. For example, the mixture may be held at incubation temperatures of about 100° until the titratable acidity is within the range of about 0.70 to 1.20 percent, calculated as lactic acid, the preferred acidity being about 0.90 percent.

The cream may be then heated to a temperature sufficiently high to inactivate the lipase, for example, at a temperature of about 175° F. for 15 minutes or at a higher temperature for a shorter period. After the heating period, the mixture is cooled preferably to about 45° to 50° F.

In the preferred operation of this new method, dry non-fat milk solids, lipolyzed cream, and an antioxidant are dispersed in water by means of a colloid mill or homogenizer to uniformly emulsify the mixture. Any desired amount of fat-free milk solids and water can be used to provide for an emulsion of any desired consistency. However, the lipolyzed cream should be added in an amount that will increase the butter fat content to at least 4.5% by weight of the total solids present. This minimum amount of butter fat is established by the American Dry Milk Association to establish the product as a buttermilk as distinguished from an ordinary skim milk which is relatively fat free. There is no limitation as to the maximum amount of butter fat that can be used to work the invention. Whatever maximum is used will be determined primarily by determining beyond what point the increase in butter fat will not produce any further increase in flavor. We have found that a product having a butter fat content of from about 6 to 8% of the total solids will produce a very flavorful product and is the amount we prefer to use. However, a product having a butter fat content of up to 10 to 12% of the total solids or higher can be made by the process of our invention and is within the scope thereof.

In the preferred embodiment of the invention the buttermilk will be ultimately dried to a powder and the amount of water used is just enough to allow for proper emulsification and drying. If the desired final product is to be a liquid sweet cream buttermilk, the water is added in an amount that it will be about 90% by weight of the total mixture, which is the approximate water content of natural sweet cream buttermilk.

The antioxidant is about 0.02% to 0.05% of the weight of fat and is added to inhibit the oxidation of the butter fat. The antioxidants we prefer to use are known as Tenox–2 and Tenox–4. The chemical composition of Tenox–2 is as follows: 70% propylene glycol, 20% butylated hydroxy anisole, 6% propyl gallate, and 4% citric acid. Tenox–4 has the following composition: 20% butylated hydroxy anisole, 20% butylated hydroxytoluene, and 60% vegetable oil. However, any other antioxidant suitable for human consumption may be used.

In the preferred embodiment of the invention, the non-fat milk solids are introduced in the form of a dry powder. However, the invention is not limited thereto as any other source of non-fat milk solids, such as skim milk or concentrated skim milk, may be use as well. If skim milk or concentrated skim milk is used as a substitute for the dry fat free milk solids, the amount of water used in the mixture will be adjusted correspondingly to give a mixture of whatever consistency is desired.

Finally, the buttermilk is dried to a powder and stored for later packaging and distribution. The drying may be done by any of the conventional milk drying techniques but we prefer to use the spray drying method. This generally comprises concentrating the emulsion in a vacuum pan and spraying the concentrated buttermilk into an atmosphere of hot air. The hot air currents remove the moisture from the mist of concentrated milk which then settle to the bottom of the hot air chamber as a powder.

The process of the invention hereinabove described does not have any specific limitations of time, temperature or pressure. I prefer to operate the process at room temperature and atmospheric pressure, and for whatever minimum time is required to perform each step.

22.3 pounds of dry non-fat milk solids having a total

Example I solids content of 21.6 pounds and a butter fat content of 0.22 pound, 2.85 pounds of a 50% butter fat cream lipolyzed with ITALASE C, and 0.35 gram of Tenox–2 were dispersed into 25.65 pounds of water by means of a colloid mill which uniformly emulsified the mixture.

The emulsion was spray dried and yielded 20 pounds of power with the following composition:

| | Percent |
|---|---|
| Water | 4.0 |
| Fat | 6.56 |
| Protein | 34.0 |
| Ash | 8.0 |
| Lactose | 45.61 |
| Lactic acid | 1.83 |

The composition of a natural sweet cream buttermilk is as follows:

| | Percent |
|---|---|
| Water | 4.0 |
| Fat | 5.0 |
| Protein | 34.0 |
| Ash | 7.9 |
| Lactose | 48.3–47.1 |
| Lactic acid | 1.0–2.0 |

Upon comparison between the sweet cream buttermilk of the instant invention and the natural buttermilk when dried and used in various bakery preparations, the flavor was found to be virtually identical. When used by concerns regularly using dry buttermilk in various preparations, the buttermilk of the instant invention met with immediate acceptance.

Example II 13 pounds of non-fat milk solids having a total solids content of 12.6 pounds and a butter fat content of 0.126 pound, 3 pounds of a 50% butter fat cream lipolyzed with Italase C, and 0.35 gram of Tenox–4 were dispersed by a colloid mill into 45 pounds concentrated skim milk having a total solids content of 13.5 pounds and a butter fat content of 0.135. The total mixture was emulsified and then spray dried to yield a powder having the following composition:

| | Percent |
|---|---|
| Water | 1.55 |
| Fat | 6.4 |
| Protein | 33.5 |
| Ash | 8.2 |
| Lactose | 48.70 |
| Lactic acid | 1.65 |

Example III 13.0 pounds of non-fat milk solids having a total solids content of 12.6 pounds and a butter fat content of 0.126 pound, 6.75 pounds of a 50% butter fat cream lipolyzed with Italase C, and 0.70 gram Tenox–4 were dispersed by a colloid mill into 45 pounds of concentrated skim milk having a total solids content of 13.5 pounds and a butter fat content of 0.135. The total mixture was emulsified and then spray dried to yield a powder having the following composition:

| | Percent |
|---|---|
| Water | 1.44 |
| Fat | 11.1 |
| Protein | 31.9 |
| Ash | 8.34 |
| Lactose | 45.55 |
| Lactic acid | 1.67 |

The product of the above example has the same general composition and flavor characteristics of a natural sweet cream buttermilk except for the fat content which is considerably higher.

The benefits and advantages of the method of the instant invention are considerable when compared with the prior method of producing sweet cream buttermilk. First of all, sweet cream buttermilk can now for the first time be produced independently of the butter churning process which will mean that the availability of sweet cream butter milk will no longer be determined by the demand for butter. Furthermore, this new buttermilk will have substantially the same chemical composition, flavor characteristics, and commercial acceptability as a natural sweet cream buttermilk and can therefore be used in place of the natural product wherever it is called for.

While the embodiment of the process of the invention chosen herein for the purposes of the disclosure is at present considered to be preferred, it is understood that this invention is intended to cover all changes or modifications in said embodiments which fall within the spirit and scope of the invention.

We claim:
1. A process for making a sweet cream buttermilk from non-fat milk solids and water comprising the steps of:
    (a) incubating cream containing butterfat with a pregastric lipase enzyme which produces short chain free fatty acids until a titratable acidity of about 0.70–1.20% calculated as lactic acid,
    (b) heating to inactivate the lipase,
    (c) mixing the lipolyzed cream with said non-fat milk solids and water to form an emulsion, said lipolyzed cream being added in an amount such that the butter fat content of the total weight of all solids is in the range of 4.5 to 12%.

2. The process of claim 1 including the step of drying said emulsion to a powder.
3. The process of claim 1 wherein said pregastric lipase enzyme is prepared from the gullet tissue of a calf.
4. The process of claim 1 wherein said lipolyzed cream is added in an amount such that the butterfat content of the total weight of all solids is about 6 to 8%.
5. The process of claim 1 wherein water is provided in the form of skim milk.

References Cited

UNITED STATES PATENTS

| | | | |
|---|---|---|---|
| 1,966,460 | 7/1934 | Otting | 99—60 X |
| 2,531,329 | 11/1950 | Farnham | 99—60 X |

OTHER REFERENCES

Manual for Dairy Manufacturing Short Courses, Dairy Manufacturing Division. The Pennsylvania State University. Kurtz Bros., Clearfield, Pa., 1956 (pp. 57–59).

Lampert, L. M. Modern Dairy Products Chemical Publ. Co. Inc., N.Y., 1965 (pp. 199–200 and 273–274).

A. LOUIS MONACELL, Primary Examiner

D. M. NAFF, Assistant Examiner

U.S. Cl. X.R.

99—54, 56